United States Patent
Steier et al.

(10) Patent No.: US 6,753,992 B2
(45) Date of Patent: Jun. 22, 2004

(54) METHOD FOR SUPPRESSING DISTORTION IN MACH-ZEHNDER OPTICAL MODULATORS WITH A CHIRPED OR VARIABLE OPERATING WAVELENGTH

(75) Inventors: William H. Steier, San Marino, CA (US); Serge Dubovitsky, Los Angeles, CA (US); Harold R. Fetterman, Santa Monica, CA (US); Joseph Michael, Los Angeles, CA (US)

(73) Assignee: Pacific Wave Industries, Inc., Los Angeles, CA (US)

( * ) Notice: Subject to any disclaimer, the term of this patent is extended or adjusted under 35 U.S.C. 154(b) by 0 days.

(21) Appl. No.: 10/172,289

(22) Filed: Jun. 14, 2002

(65) Prior Publication Data

US 2003/0231372 A1 Dec. 18, 2003

(51) Int. Cl.[7] .............. G02F 1/01; G02F 1/03; G02F 1/035; H04B 10/04
(52) U.S. Cl. .............. 359/237; 359/239; 359/245; 359/254; 359/279; 398/182; 398/188; 398/197; 398/199; 385/2; 385/3; 392/94
(58) Field of Search ................. 359/245, 249, 359/237, 239, 260, 254, 279; 398/182, 183, 188, 197, 198, 199; 385/2, 3, 4, 8; 372/26, 29, 94

(56) References Cited

U.S. PATENT DOCUMENTS

| | | | |
|---|---|---|---|
| 5,781,327 A | * | 7/1998 | Brock et al. ........... 359/249 |
| 6,091,864 A | * | 7/2000 | Hofmeister ............. 385/2 |
| 6,122,414 A | * | 9/2000 | Shimizu ................ 385/2 |
| 6,362,913 B2 | * | 3/2002 | Ooi et al. .............. 359/245 |
| 6,407,845 B2 | * | 6/2002 | Nakamoto .............. 359/239 |
| 6,580,532 B1 | * | 6/2003 | Yao et al. .............. 398/39 |

OTHER PUBLICATIONS

L. R. Dalton et al., "From molecules to opto–chips: organic electro–optic materials," *J. Mater. Chem.*, 1999, 9, 1905–1920.

S. Lee et al., "Demonstration of a Photonically Controlled RF Phase Shifter," *IEEE Microwave and Guided Wave Letters*, vol. 9, No. 9, Sep. 1999, 357–359.

H. Erlig et al., "Applications of State–of–the–Art Polymer Modulators," *OSA Conference on Integrated Photonics Research*, Monterey, CA, US, Jun. 11–13, 2001.

S. Dubovitsky et al., "Performance of a Mach–Zehnder modulator with a chirped carrier and a novel method for suppression of second order distortion," *DARPA Review*, Jun. 17, 2001.

W. Steier et al., "Photonic Assisted A/D: Systems and Spectral Equalization Studies," *DARPA Review*, Jun. 17, 2001.

* cited by examiner

*Primary Examiner*—Loha Ben
(74) *Attorney, Agent, or Firm*—Henricks, Slavin & Holmes LLP

(57) ABSTRACT

A method for suppressing distortion in a multi-wavelengths system which uses a Mach Zehnder optical modulator includes adjusting an internal path length mismatch of the modulator and changing an applied voltage, $V_b$, such that the combination biases the modulator to the required $\pi/2$ phase bias.

16 Claims, 2 Drawing Sheets

METHOD FOR SUPPRESSING DISTORTION IN MACH-ZEHNDER OPTICAL MODULATORS WITH A CHIRPED OR VARIABLE OPERATING WAVELENGTH

STATEMENT REGARDING FEDERALLY SPONSORED RESEARCH AND DEVELOPMENT

This invention was made with support from the government of the United States of America under Contracts F49620-99C-0040, F33615-00-C-5019 and F3060201-C-0160 awarded by the United States Air Force and Contract N66001-98-1-8925 awarded by the United States Navy. The government of the United States of America has certain rights in this invention as provided by these contracts.

BACKGROUND OF THE INVENTION

The wavelength response of a Mach-Zehnder intensity modulator plays an important role in the Wavelength Division Multiplexing (WDM) where a single variable or multiple wavelengths may be modulated by a single modulator. The modulator properties relevant to WDM have been investigated. See, V. Poudyal and M. Mezhoudi, "Simultaneous modulation of multiple optical channels with a single Ti:LiNbO3 Mach-Zehnder modulator in a WDM system," *ICT '98 International Conference on Telecommunications*, pp. 72–76, 1998, incorporated herein by reference. Similar to WDM, modulator wavelength response plays a key role in Photonic Time Stretch and WDM Sampling techniques currently used for enhancing the performance of Analog-to-Digital Converters (ADC). In these systems, the carrier wavelength is continuously tuned while the modulation is being applied.

Changes in the carrier wavelength shift the modulator bias from the optimum $\pi/2$ bias point and cause a strong increase in the second order distortion. At a certain detuning from the center wavelength, the second order distortion begins to exceed the third order one and therefore, in systems with greater than one octave bandwidth, begins to degrade the Spur Free Dynamic Range (SFDR) of the system. To prevent SFDR degradation due to second order distortion, it is therefore presently necessary to limit the optical bandwidth of the system.

Thus, it would be helpful to be able to extend a modulator response analysis to systems with a chirped carrier. It would also be helpful to be able to provide a technique for second-order distortion suppression that is applicable to all multi-wavelengths systems. Furthermore, it would be helpful to be able to provide a wavelength independent biasing (WEB) technique that allows the optical bandwidth of a system to be extended.

BRIEF DESCRIPTION OF THE DRAWINGS

Detailed description of embodiments of the invention will be made with reference to the accompanying drawings.

DETAILED DESCRIPTION

Figure 1:
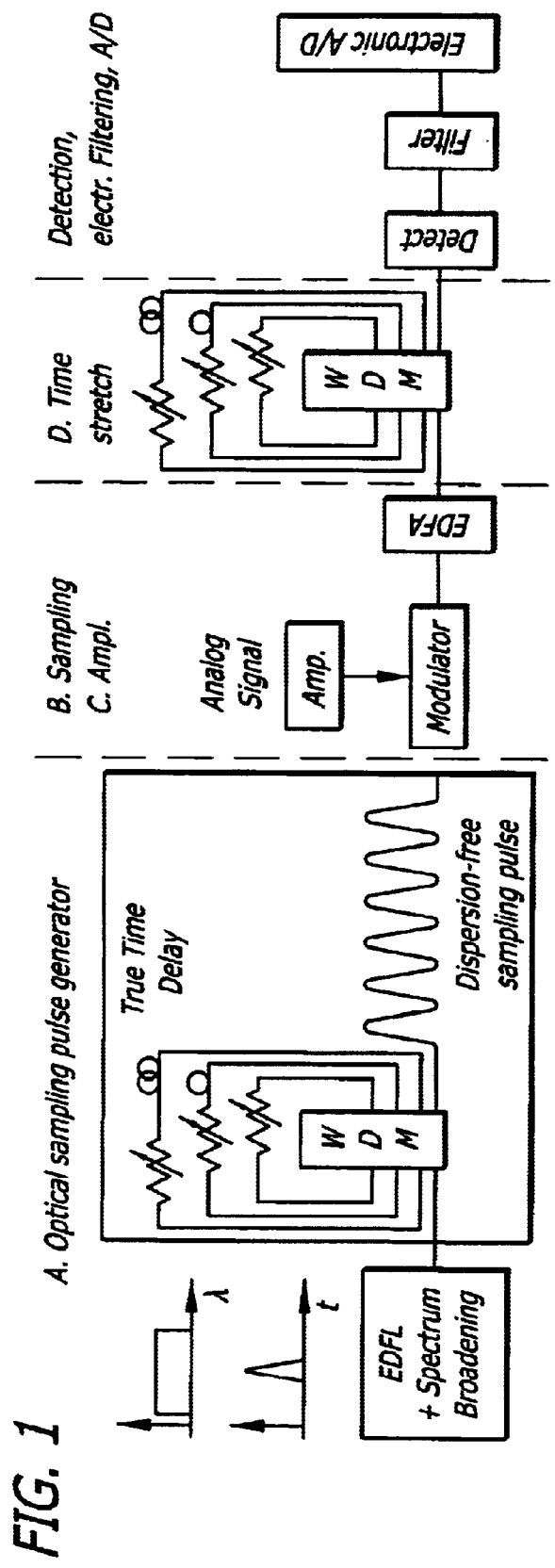
FIG. 1 is a functional block diagram of a wide optical bandwidth system suitable for application of the wavelength insensitive bias technique of the present invention.

The following is a detailed description of the best presently known mode of carrying out the invention. This description is not to be taken in a limiting sense, but is made merely for the purpose of illustrating the general principles of the invention.

Single Wavelength Operation

The Mach-Zehnder transmission is given by $$T(\lambda) = \frac{1}{2}\left[1 + \cos\left(\pi \frac{V}{V_\pi(\lambda)} + \phi_0\right)\right] \quad (1)$$

where $$\phi_o = 2\pi\frac{\Delta_{nL}}{\lambda} + \pi\frac{V_b}{V_\pi} \text{ -- modulator phase bias}$$

$\Delta_{nL}$—internal pathlength mismatch between the two arms of the interferometer, $n_1L_1 - n_2L_2$ $\lambda$—optical wavelength in vacuum $V_b$—externally applied bias voltage $$V_\pi(\lambda) = \frac{\lambda d}{2\Gamma(\lambda)n^3(\lambda)r_{33}(\lambda)L_m} \text{ -- voltage needed for a } \pi \text{ phase change} \quad (1b)$$

d—electrode separation, $L_m$—electrode length $\Gamma(\lambda)$—confinement factor which is defined as the ratio of the change in the effective index of refraction of the waveguide mode to the change in index of refraction of the electro-optic material.

$n(\lambda)$—index of refraction

First and second order inter-modulation distortions and their impact on the SFDR are now considered. In B. H. Kolner and D. W. Dolfi, "Intermodulation distortion and compression in an integrated electrooptic modulator," *Appl. Optics*, vol. 26, no. 17, pp. 3676–3680, 1987, incorporated herein by reference, general expressions have been derived for the spectral components of the photodetector current assuming two rf modulation signals. In the following, it is assumed that both rf modulations have equal amplitudes (V):

$$i_1 = -C_i 2\sin\phi_o J_1\left(\pi\frac{V}{V_\pi}\right)J_0\left(\pi\frac{V}{V_\pi}\right) \text{ -- signal current} \quad (2a)$$

$$i_2 = -C_i 2\cos\phi_o J_1^2\left(\pi\frac{V}{V_\pi}\right) \text{ -- second order intermodulation distortion} \quad (2b)$$

$$i_3 = \quad (2c)$$
$$C_i 2\sin\phi_o J_1\left(\pi\frac{V}{V_\pi}\right)J_2\left(\pi\frac{V}{V_\pi}\right) \text{ -- third order intermodulations distortion}$$

where $C_i$ is a constant containing detector responsivity and optical power.

When the modulator is biased at $\phi_o = \pi/2$, the second order distortion is eliminated.

The SFDR is dominated by the third order and is given in Kolner and Dolfi by $$SFDR_3(dB) = \frac{20}{3}\log\left(\frac{2i_{ave}}{qB}\right) \quad (3)$$

where $i_{ave}$—average current out of the photodetector

B—electrical bandwidth q—electron charge

As the wavelength de-tunes from the nominal, $\lambda_o$, two effects occur: the bias deviates from $\pi/2$ and the modulation index, $$m \equiv \pi\frac{V}{V_\pi(\lambda)},$$

changes because of changing $V_\pi$. The bias shift causes a very rapid increase in the second order distortion, but has a small impact on the fundamental and third order distortion terms [see, V. Poudyal and M. Mezhoudi, "Wavelength sensitivity of Ti:LiNbO3 Mach-Zehnder interferometer," *Proceedings of the SPIE*, vol. 2291, pp. 196–207, 1994, incorporated herein by reference] and therefore at some wavelength detuning, the SFDR starts degrading due to rising second order intermodulation distortion. The second effect, change in the modulation index, is a very small effect that, to the first order, has no effect on the SFDR.

Consequently, it is the rise of the second order distortion due to the bias shift that limits the optical bandwidth of the modulator. The change in phase bias away from $\pi/2$ that would make the SFDR be dominated by the second order [see, Kolner and Dolfi] is given by $$\Delta\phi_o = \phi_o - \frac{\pi}{2} \approx \pm 2^{-\frac{2}{3}}\left(\frac{qB}{i_{ave}}\right)^{\frac{1}{6}} = \pm\frac{1}{\sqrt{2}}10^{-\frac{SFDR_3}{40}} \text{ assuming } SFDR_3 \gg 1 \quad (4)$$

For an internally trimmed modulator that does not require bias voltage, the allowable optical bandwidth is given by $$\Delta\lambda = \frac{2\sqrt{2}}{\pi}10^{-\frac{SFDR_3}{40}}\lambda_o \quad (5)$$

meaning that the wavelength can deviate by $$\pm\frac{1}{2}\Delta\lambda$$

from the center wavelength, $\lambda_o$, before the SFDR degrades below the specified value due to second order distortion. For a SFDR of 100 dB at $\lambda_o=1550$ nm, this distortion limits the optical bandwidth to $\Delta\lambda=4.4$ nm. If the modulator was biased at a higher multiple of $\pi/2$, then the wavelength dependence would be higher and the bandwidth appropriately lower.

For an untrimmed modulator that does require bias voltage, i.e., $$2\pi\frac{\Delta_nL}{\lambda} = 0$$

and $V_b=V_\pi/2$, the allowable optical bandwidth is given by $$\Delta\lambda = \frac{2\sqrt{2}}{\pi}10^{-\frac{SFDR_3}{40}}\frac{V_\pi(\lambda_o)}{\left.\frac{dV_\pi}{d\lambda}\right|_{\lambda_o}} \quad (6)$$

A typical LiNbO$_3$ modulator (e.g., Sumitomo MZ modulator TMZ-10) has $$\frac{dV_\pi}{d\lambda} = 8 \text{ V/}\mu\text{m}$$

V/$\mu$m and, therefore, again assuming an SFDR of 100 dB, the optical bandwidth is limited to 2.1 nanometer.

Chirped Carrier

In Photonic Time Stretch systems, a continuously swept wavelength (chirped carrier) is fed into the modulator. In this section, the above analyses are extended to determine the optical bandwidth limitations imposed on the chirped wavelength system by the wavelength dependent modulator response.

The powers in various spectral harmonics generated at the output of the modulator are now considered. The proper way to do this with a continuously tunable wavelength is to combine the signal modulation and the additional modulation due to changing carrier wavelength over the time aperture of interest and then take a Fourier transform. In this manner, results of numerical simulations were also obtained. Simplified analytical results are obtained by using the expressions for harmonics amplitudes obtained for a single fixed wavelength, equation (2), and by averaging the power in these harmonics over the wavelength sweep. This is acceptable as long as the modulation induced by the temporal variation of the carrier wavelength is small. Simplified analytical treatment facilitates making predictions that can then be confirmed with exact numerical simulations.

The rf power in the harmonics averaged over the wavelength sweep is given by $$\overline{P}_j = C_P\frac{1}{\Delta\lambda}\int_{-\frac{\lambda}{2}}^{\frac{\lambda}{2}}|i_j(\lambda)|^2 d\lambda \quad (6)$$

where $i_j(\lambda)$ are the photodetector currents given in equation (2) and j=1 is the fundamental, j=2 second order and j=3 third order intermodulation distortions $C_p$—constant to convert currents to relevant electrical powers The integration produces the following results:

$$\overline{P}_1 = C_P 2J_1^2\left(\pi\frac{V}{V_\pi}\right)J_0^2\left(\pi\frac{V}{V_\pi}\right)[1 + \text{sinc}(\Delta\phi_o)] \quad (7)$$

$$\overline{P}_2 = C_P 2J_1^4\left(\pi\frac{V}{V_\pi}\right)[1 - \text{sinc}(\Delta\phi_o)]$$

$$\overline{P}_3 = C_P 2J_1^2\left(\pi\frac{V}{V_\pi}\right)J_2^2\left(\pi\frac{V}{V_\pi}\right)[1 + \text{sinc}(\Delta\phi_o)]$$

These results have been confirmed by numerical simulations.

The SFDR$_3$ is unchanged by the wavelength sweep and is given by the swept wavelength operation and is still given by eq. (3)

$$SFDR_3(dB) = \frac{20}{3} \log\left(\frac{2i_{ave}}{qB}\right) \quad (8)$$

This occurs because fundamental and third order are impacted similarly by the changing wavelength.

The change in phase bias away from $\pi/2$ that would make the SFDR be dominated by the second order is now given by $$\Delta\phi_o = \pm\sqrt{3}\, 2^{\frac{1}{3}}\left(\frac{qB}{i_{ave}}\right)^{\frac{1}{6}} = \pm\sqrt{6}\, 10^{-\frac{SFDR_3}{40}} \quad (9)$$

and is different from the single tunable wavelength case by a small constant.

For an internally trimmed modulator that does not require bias voltage, the allowable optical bandwidth is now given by $$\Delta\lambda = \frac{2\sqrt{6}}{\pi} 10^{-\frac{SFDR_3}{40}} \lambda_o \quad (9a)$$

For a SFDR of 100 dB at $\lambda_o=1550$ nm, this distortion limits the optical bandwidth to $\Delta\lambda=7.6$ nm.

Limitation of the allowable optical bandwidth to 7.6 nm would severely degrade performance of Photonic Time Stretch systems. It is highly desireable to use the entire width of the optical spectrum available from the supercontinuoum sources (>60 nm). The following section includes a description of a Wavelength Insensitive Bias (WIB) technique that suppresses the second order distortion due to de-tuning of the wavelength and therefore greatly extends the optical bandwidth of the system.

Suppression Of The Second-Order Distortion: Wavelength Insensitive Bias Technique In the preceding sections, it was described how a typical modulator limits the optical bandwidth of a system, such as the wide optical bandwidth system shown in FIG. 1. For a 100 dB SFDR, the allowable optical bandwidth is limited to a few nanometers. The bias of the modulator is given by the following expression $$\phi_o = 2\pi\frac{\Delta_{nL}}{\lambda} + \pi\frac{V_b}{V_\pi} \quad (10)$$

where Vb—is the bias voltage used to trim the modulator and $\Delta_{nL}$—pathlength mismatch between the two arms of the Mach-Zehnder modulator Arranged so that i) at the center wavelength, $\lambda_o$, the modulator is biased at $\pi/2$ and ii) the bias does not change, to the first order, as the wavelength detunes from the center:

i) $\phi_o = \pi/2$ at $\lambda_o$ and  (11)

ii) $\left.\frac{d\phi_o}{d\lambda}\right|_{\lambda_o} = 0$  (12)

Condition i) implies the following connection between the internal modulator pathlength mismatch and the required bias voltage:

$$V_b = \frac{V_{\pi o}}{2}\left[1 - 4\frac{\Delta_{nLo}}{\lambda_o}\right] \quad (13)$$

And condition ii) results in the following choice for internal pathlength mismatch $$\Delta_{nLo} = \frac{\lambda}{4}\left[\frac{R - 4\frac{d\Delta_{nL}}{d\lambda}}{R - 1}\right] \quad (14)$$

where $R \equiv \dfrac{\left.\dfrac{dV_\pi}{d\lambda}\right|_{\lambda_o}}{\dfrac{V_{\pi o}}{\lambda_o}}$ In the above equation, the ratio R expresses the nonlinearity of the $V_\pi$ dependence on wavelength and is a key characteristic of the modulator. It can be thought of as a ratio of a local slope of the $V_\pi$ dependence on wavelength, $$\left.\frac{dV_\pi}{d\lambda}\right|_{\lambda_o},$$

to the slope of the global linear approximation, $$\frac{V_{\pi o}}{\lambda_o}.$$

The expression for $V_\pi$ is given in the definitions following equation (1) and it can be seen that if the confinement factor ($\Gamma$), index (n), and $r_{33}$ were wavelength independent, then $V_\pi$ would be a linear function of wavelength and the ratio R would be equal to one. This in turn would drive the denominator to zero indicating that there is no finite internal pathlength mismatch, $\Delta_{nLo}$, that would make the modulator bias insensitive to wavelength. Fortunately this turns out not to be the case for typical modulators.

For example, a polymer modulator described in H. Zhang, M.-C. Oh, A. Szep, W. H. Steier, C. Zhang, L. R. Dalton, H. Erlig, Y. Chang, D. H. Chang, and H. R. Fetterman, "Push Pull Electro-Optic Polymer Modulators with Low Half-wave Voltage and Low Loss at Both 1310 and 1550 µm," *Appl. Phys. Lett.*, 78, 3136-8 (2001), incorporated herein by reference, has a $V_\pi=1.2$ V @ 1.310 µm and $V_\pi=1.8$ V @ 1.550 µm resulting in $dV_\pi/d\lambda=2.5$ V/µm. At 1.55 µm, this gives a value of 2.2, indicating that it is possible to calculate finite optimum $\Delta_{nL}$ and use the Wavelength Insensitive Bias technique.

The term $$4\frac{d\Delta_{nL}}{d\lambda}$$

expresses the change in internal pathlength mismatch with wavelength. This occurs due to index change with wavelength and is much smaller than R. For example, for a polymer modulator, $$\frac{dn}{d\lambda} \approx -0.02 \text{ um}^{-1}$$

um$^{-1}$ at 1.55 µm. Assuming an ideal pathlength mismatch of $\Delta_{nL}=\lambda/4$ and an index of n~1.6, there is a length mismatch of $\Delta L=242$ nanometers resulting in $$4\frac{d\Delta_{nL}}{d\lambda} = 4\frac{dn}{d\lambda}\Delta L = 0.02 \qquad (15)$$

Because the value of $$4\frac{d\Delta_{nL}}{d\lambda} \sim 0.02$$

is much smaller than R~2, it can be neglected in equation (14) resulting in a simple prescription for an internal modulator pathlength mismatch that, for a given modulator, eliminates the first order dependence of bias point on carrier wavelength:

$$\Delta_{nLo} \approx \frac{\lambda}{4}\left[\frac{R}{R-1}\right] \qquad (16)$$

Figure 2:
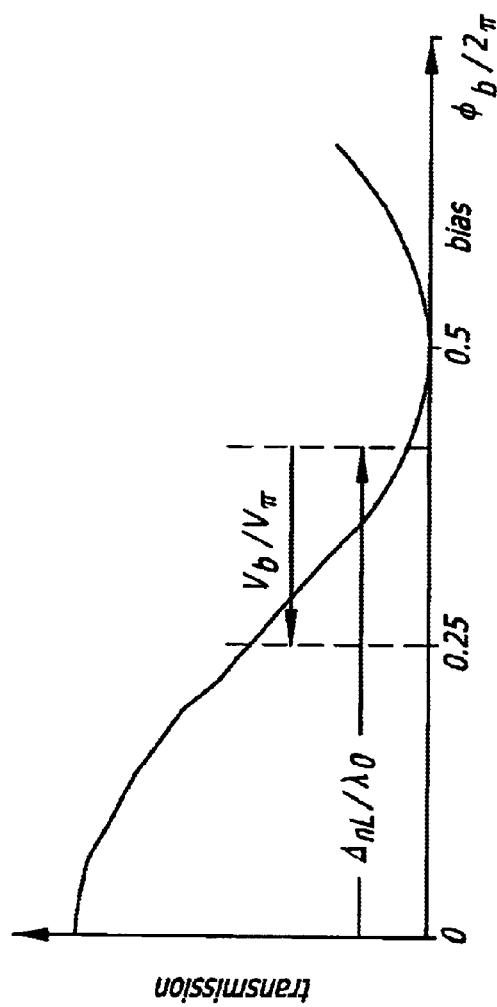
FIG. 2 is a plot of transmission versus bias illustrating modulator biasing to achieve wavelength independent biasing according to the present invention.

For the polymer modulator considered above with R=2.2, $\Delta_{nLo}$=0.46 $\lambda$. Consequently, by adjusting the internal pathlength mismatch of the referenced modulator to 0.46 $\lambda$ and using a bias voltage equal to $V_b$=−0.42 $V_\pi$ to trim the phase bias to $\pi/2$, as shown in FIG. 2, then the first order dependence of the phase bias on wavelength will be eliminated. This occurs because the effect on phase bias of $V_\pi$ changing with wavelength cancels the phase bias changes due to wavelength dependence of the internal bias.

Figure 3A:
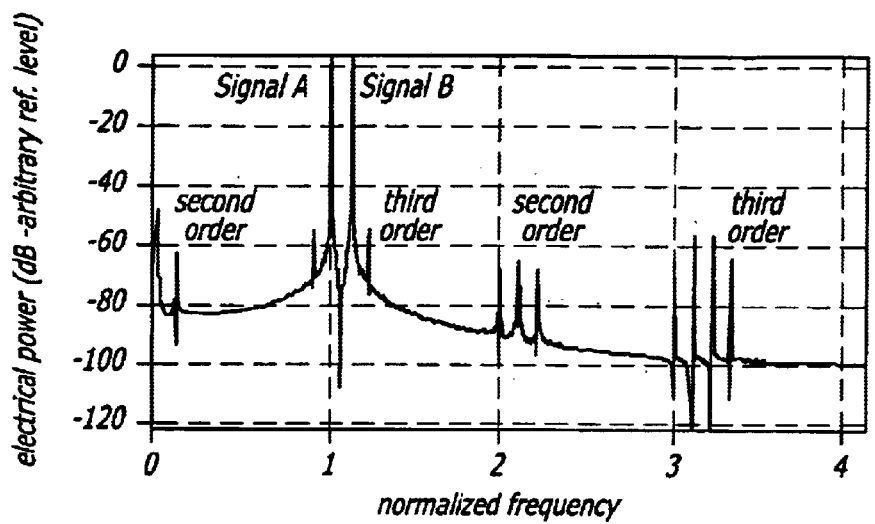
FIGS. 3A and 3B are spectrum plots of electrical power versus normalized frequency for, respectively, a modulator with an internal pathlength bias of $\lambda/4$ and a polymer modulator with WIB according to the present invention.
Figure 3B:
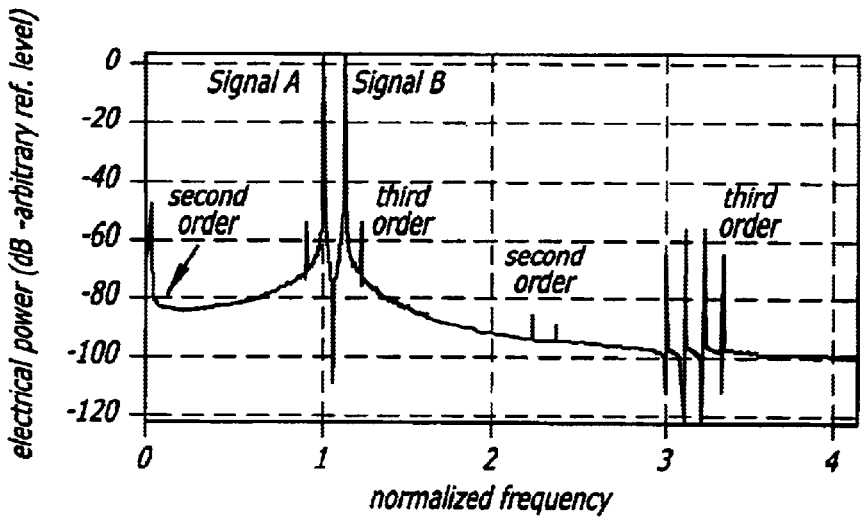

FIGS. 3A and 3B show numerical simulations of modulation spectra coming out of a) a modulator with an internal pathlength bias of $\lambda/4$ and b) a polymer modulator with WIB according to the present invention. In the WIB modulator, additional internal pathlength offset is used to match the $V_\pi$ wavelength and the second-order distortion is suppressed. The residual second order distortion is due to higher order dependecies of $V_\pi$ on wavelength. To calculate the resulting allowable optical spectrum for a WIB modulator, these higher order $V_\pi$ an dependencies would have to be determined and considered.

Equation (14) specifies the internal pathlength mismatch, $\Delta_{nL}$, needed to suppress second order distortion. The needed amount of $\Delta_{nL}$ is determined by the R parameter and to use this effect in a practical modulator, the value of R should be significantly different from one so that $\Delta_{nL}$ is finite.

Parameter R expresses the nonlinearity of the $V_\pi$ an dependence on wavelength. This dependence is examined below, and the following description shows how it is determined by the choice of design parameters and materials.

Differentiating eq. (1b) with respect to wavelength results in the following derivative $$\frac{dV_\pi}{d\lambda} = \frac{V_\pi}{\lambda}\left[1 - \lambda\left(3\frac{dn/d\lambda}{n} + \frac{dr/d\lambda}{r} + \frac{d\Gamma/d\lambda}{\Gamma}\right)\right] \qquad (17)$$

and therefore $$R = \frac{dV_\pi}{d\lambda}\bigg|_{\lambda o} / \frac{V_{\pi o}}{\lambda_o} = \left[1 - \left(3\frac{dn/d\lambda}{n/\lambda} + \frac{dr/d\lambda}{r/\lambda} + \frac{d\Gamma/d\lambda}{\Gamma/\lambda}\right)\bigg|_{\lambda o}\right] \qquad (18)$$

For a polymer modulator, measurements indicate $$R_n \equiv \frac{(dn/d\lambda)|_{\lambda o}}{n_o/\lambda_o} = \frac{-0.02\ \mu m^{-1}}{(1.59/1.55)\ \mu m^{-1}} = -0.024$$

$$R_r \equiv \frac{(dr/d\lambda)|_{\lambda o}}{r_o/\lambda_o} = \frac{-26\ (pm/V/\mu m)}{54/1.55\ (pm/V/\mu m)} = -0.75$$

$$R_\Gamma \equiv \frac{(d\Gamma/d\lambda)|_{\lambda o}}{\Gamma/\lambda_o} = \frac{\Delta\Gamma}{\Gamma_o} / \frac{\Delta\lambda}{\lambda_o} = -0.07$$

The above evaluation shows that the R-value of the Zhang et al. polymer modulator, supra, is dominated by the nonlinearity of the r-coefficient on wavelength and therefore can be tailored by the choice of materials. The low wavelength dependence of the confinement factor in this design is because even as the mode expands its overlap with the applied electric field changes very little. Using the above values for R's in equation (18) results in R=1.9.

It has been observed, by comparing the polymer modulator R-value to that of lithium niobate, that the wavelength dependence of $LiNbO_3$ modulators is dominated by the confinement factor and therefore can be tailored by the waveguide design.

Figure 4:
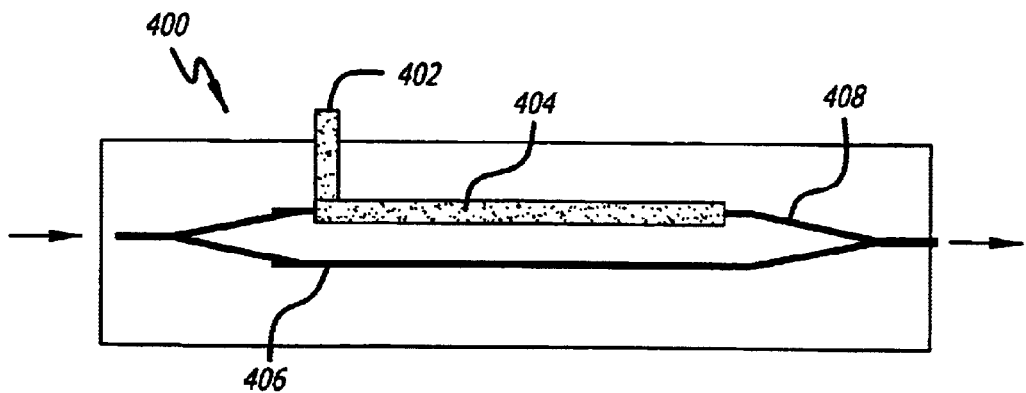
FIG. 4 shows a Mach-Zehnder modulator configured for implementing the biasing technique of the present invention.

FIG. 4 shows a Mach-Zehnder optical modulator 400 with arms trimmed to $\Delta_{nLo}$ optical path difference and $V_b$ bias voltage applied at 402 to suppress second order distortion in multiple wavelength operation. The Mach-Zehnder optical modulator 400 comprises optical waveguides 406 and 408; biasing electrode 404 for the modulator is also shown. The lower arm 406 has a different optical pathlength from the upper arm 408 by $\Delta_{nLo}$.

Although the present invention has been described in terms of the embodiment(s) above, numerous modifications and/or additions to the above-described embodiment(s) would be readily apparent to one skilled in the art. It is intended that the scope of the present invention extends to all such modifications and/or additions.

We claim:

1. A method for suppressing distortion in an optical modulator, comprising:
   adjusting an internal path length mismatch of an optical modulator and using a bias voltage, $V_b$, equal to a multiple of a voltage, $V_\pi$, needed for a $\pi$ phase change to trim a phase bias associated with the optical modulator to $\pi/2$ eliminating a dependence of the phase bias on wavelength.

2. The method for suppressing distortion in an optical modulator of claim 1, wherein the internal path length mismatch is a function of a dependence of $V_\pi$ on wavelength.

3. The method for suppressing distortion in an optical modulator of claim 2, wherein the dependence of $V_\pi$ on wavelength is nonlinear.

4. The method for suppressing distortion in an optical modulator of claim 2, wherein the dependence of $V_\pi$ on wavelength is determined from a choice of design parameters and/or materials.

5. The method for suppressing distortion in an optical modulator of claim 1, wherein the internal path length mismatch is a function of a ratio of a local slope of the dependence of $V_\pi$ an on wavelength to a local slope of a global linear approximation.

6. The method for suppressing distortion in an optical modulator of claim 1, wherein the optical modulator comprises a Mach-Zehnder optical modulator.

7. The method for suppressing distortion in an optical modulator of claim 1, wherein the optical modulator comprises a Mach-Zehnder optical modulator with a chirped or variable operating wavelength.

8. A method for second-order distortion suppression in a multi-wavelengths system, comprising:

employing an internal path length offset in a multi-wavelengths system to match a wavelength of a voltage, $V_\pi$, needed for a $\pi$ phase change.

9. The method for second-order distortion suppression in a multi-wavelengths system of claim 8, wherein the multi-wavelengths system comprises an optical modulator.

10. The method for second-order distortion suppression in a multi-wavelengths system of claim 8, wherein the multi-wavelengths system comprises a Mach-Zehnder optical modulator.

11. The method for second-order distortion suppression in a multi-wavelengths system of claim 8, wherein the multi-wavelengths system comprises a Mach-Zehnder optical modulator with a chirped or variable operating wavelength.

12. A method for canceling phase bias changes in a system including an optical modulator, comprising:

changing a voltage, $V_\pi$, needed for a $\pi$ phase change in a system including an optical modulator depending upon an operating wavelength associated with the system to cancel phase bias changes in the system.

13. The method for canceling phase bias changes in a system including an optical modulator of claim 12, wherein the phase bias changes are due to a wavelength dependence of an internal bias.

14. The method for canceling phase bias changes in a system including an optical modulator of claim 12, wherein the operating wavelength is chirped.

15. The method for canceling phase bias changes in a system including an optical modulator of claim 12, wherein the operating wavelength is variable.

16. The method for canceling phase bias changes in a system including an optical modulator of claim 12, wherein the optical modulator comprises a Mach-Zehnder optical modulator.

* * * * *